US009894571B2

United States Patent
Wegmann et al.

(10) Patent No.: US 9,894,571 B2
(45) Date of Patent: Feb. 13, 2018

(54) ENHANCED MOBILITY ROBUSTNESS OPTIMIZATION

(71) Applicant: Nokia Solutions and Networks Oy, Espoo (FI)

(72) Inventors: Bernhard Wegmann, Holzkirchen (DE); Ingo Viering, Munich (DE); Richard Waldhauser, Munich (DE); Krzysztof Kordybach, Pulawy (PL); Yi Zhi Yao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/890,644

(22) PCT Filed: May 17, 2013

(86) PCT No.: PCT/EP2013/060237
§ 371 (c)(1),
(2) Date: Nov. 12, 2015

(87) PCT Pub. No.: WO2014/183794
PCT Pub. Date: Nov. 20, 2014

(65) Prior Publication Data
US 2016/0095025 A1   Mar. 31, 2016

(51) Int. Cl.
*H04W 36/00* (2009.01)
*H04W 24/02* (2009.01)
*H04W 76/02* (2009.01)

(52) U.S. Cl.
CPC ....... *H04W 36/0083* (2013.01); *H04W 24/02* (2013.01); *H04W 76/028* (2013.01)

(58) Field of Classification Search
CPC .......... H04W 24/02; H04W 36/0083; H04W 76/028
(Continued)

(56) References Cited

U.S. PATENT DOCUMENTS

2010/0173626 A1* 7/2010 Catovic .............. H04W 76/027
455/423
2012/0165024 A1* 6/2012 Sugahara ........... H04W 36/245
455/440
(Continued)

FOREIGN PATENT DOCUMENTS

WO   WO 2009/052686     4/2009
WO   WO 2012/019339 A1  2/2012
(Continued)

OTHER PUBLICATIONS

3GPP TS 32.425 V11.4.0 (Dec. 2012), "3$^{rd}$ Generation Partnership Project; Technical Specification Group Services and System Aspects; Telecommunication management; Performance Management (PM); Performance measurements Evolved Universal Terrestrial Radio Access Network (E-UTRAN) (Release 11)", 70 pgs.
(Continued)

*Primary Examiner* — Timothy Pham
(74) *Attorney, Agent, or Firm* — Harrington & Smith (57) ABSTRACT

Methods, apparatus and computer program products are disclosed for enhancing mobility robustness optimization in self optimizing networks. Neighbor relation information indicating relations between a handover source cell and candidate handover target cell(s), each including a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell. A first candidate handover target cell to which handover of the user equipment was unsuccessful and a second candidate handover target cell to which the user equipment has re-established a connection, out of the candidate handover target cells, are determined. The first counter and/or the second counter of
(Continued)

aHWC A→B→C the neighbor relation information concerning the determined first and second candidate handover target cells is updated.

15 Claims, 6 Drawing Sheets

(58) Field of Classification Search
USPC .......................................................... 455/436
See application file for complete search history.

(56) References Cited

U.S. PATENT DOCUMENTS

| 2014/0045500 | A1* | 2/2014 | Dimou | H04W 36/0083 |
| | | | | 455/436 |
| 2015/0009802 | A1* | 1/2015 | Wager | H04W 76/027 |
| | | | | 370/218 |
| 2015/0195762 | A1* | 7/2015 | Watanabe | H04W 36/0083 |
| | | | | 455/436 |
| 2015/0281040 | A1* | 10/2015 | Yamine | H04W 24/02 |
| | | | | 455/436 |

FOREIGN PATENT DOCUMENTS

| WO | WO 2012/141627 A1 | 10/2012 |
| WO | WO 2013/020604 A1 | 2/2013 |

OTHER PUBLICATIONS

3GPP TS 36.300 V11.5.0 (Mar. 2013), $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 209 pgs.

3GPP TR 36.902 V9.3.1 (Mar. 2011), "$3^{rd}$ Generation Partnership Project; Technical Specification Group Radio Access Network; Evolved Universal Terrestrial Radio Access Network (E-UTRAN); Self-configuring and self-optimizing network (SON) use cases and solutions (Release 9)" 21 pgs.

* cited by examiner

Fig. 1a aHWC A→B→C

Fig. 1b bHWC A→C→B

ENHANCED MOBILITY ROBUSTNESS OPTIMIZATION

FIELD OF THE INVENTION

The present invention generally relates to wireless communication networks, and more specifically relates to a method, apparatus and computer program product for enhancing mobility robustness optimization in self optimizing networks.

BACKGROUND

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture according to 3GPP specification.

The technical field according to the present invention is mobile radio communications with focus on LTE and self optimizing networks SON, in particular mobility robustness optimization MRO.

The target of mobility robustness optimization is to optimize mobility related network configuration parameters, such as handover HO trigger parameters and HO thresholds or timers, in order to reduce radio link failures RLFs caused by mobility as well as handover failures HOFs.

In the prior art, 3GPP RAN WG3 (cf. prior art documents [1] and [2]) has specified so-called mobility robustness optimization failure types "Too late handover HO", "Too early handover HO" and "Handover HO to Wrong Cell", which help to decide for the right correction measure. These mobility robustness optimization failure types can be seen as mobility robustness optimization key performance indicators KPI.

That is, the measurements of too early handovers, too late handovers and to wrong cell handovers are obtained respectively by accumulating the number of failure events related to handover which are identified by the eNB according to the definitions in prior art document [1].

In addition, mobility robustness optimization determines the cell which is responsible for this failure. Normally this is the cell that has initiated the handover or has missed to initiate the handover. Mobility robustness optimization follows the rule that these key performance indicators are counted for those cells, more precisely the key performance indicators are counted per neighbor relation, e.g. if a "Too late HO" occurred at cell A and a user equipment UE managed to re-connect at cell B the key performance indicators is assigned to the neighbor relation "cell A to cell B".

The counted mobility robustness optimization failure types are reported as performance management PM data to the network management (cf. prior art document [3]). The correction procedure can therefore be initiated by network management, i.e. in a centralized manner, or directly in the evolved NodeB (base station) eNB, i.e. in a decentralized manner. For latter case, the performance management data sent to the network management may be only for monitoring purpose.

PRIOR ART DOCUMENTS

[1] 3GPP TS 36.300, "E-UTRAN Overall description", Stage 2, Release 11.

[2] 3GPP TR 36.902: "Evolved Universal Terrestrial Radio Access Network (E-UTRAN); Self-configuring and self-optimizing network (self optimizing networks) use cases and solutions", Technical Report.

[3] 3GPP TS 32.425, Performance Management (performance management), Performance measurements (E-UTRAN).

In case of the centralized correction approach, there is the advantage that network management NM is able to evaluate all the available performance management data apart from the mobility robustness optimization. Those reported performance management measurements are assigned to a instance of an object class that is representing a unidirectional neighbor cell relation from a source cell to a target cell (cf. prior art document [3]).

The problem is, however, that in case of "Handover to Wrong Cell" HWC, a third cell is involved other than the source cell and the target cell.

Figure 1A:
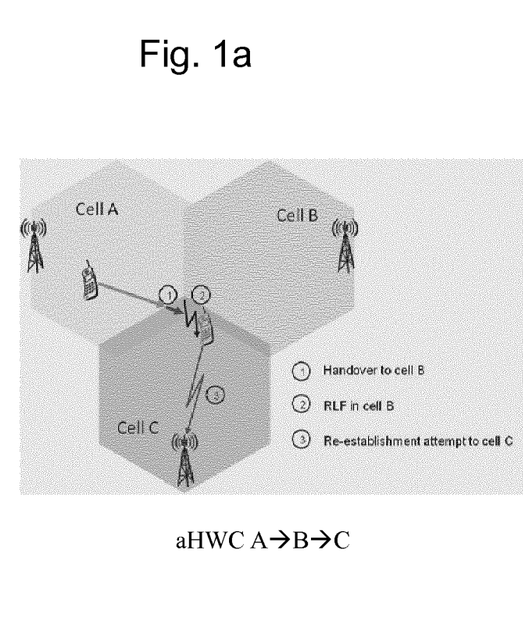
FIG. 1 schematically shows handover to wrong cell cases.
Figure 1B:
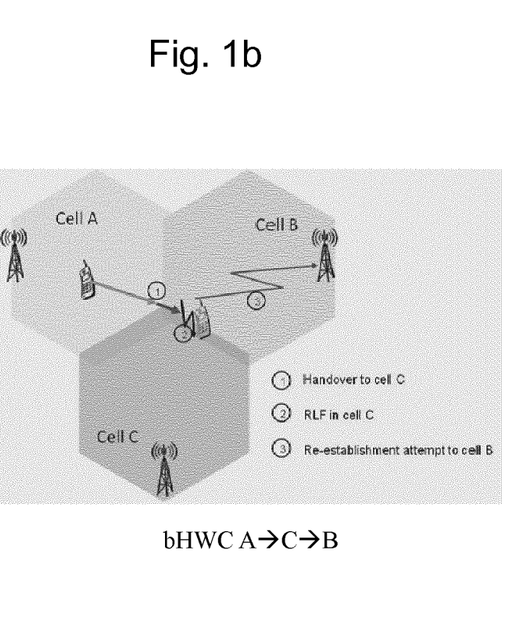

FIG. 1 shows cases of handover HO to wrong cells, in particular FIG. 1a indicates a Handover to Wrong Cell A→B→C, and FIG. 1b indicates a Handover to Wrong Cell A→C→B.

As becomes apparent from FIGS. 1a and 1b, the case of "Handover to Wrong Cell" HWC may be defined as following:

An RLF occurs shortly after a successful handover from a source cell (Cell A) to a target cell (Cell B) or a handover failure occurs during the handover procedure; the UE attempts to re-establish the radio link connection in a cell (Cell C) other than the source cell and the target cell (cf. prior art document [1]).

And having a third cell involved means that there are two neighbor relationships involved whereas only one is considered by the object class used on the performance management data model.

The problem is however that a HWC is a single counter per neighbor relation (neighbor relation) in cell A, i.e. it can be counted in neighbor relation_A-B.HWC or neighbor relation_A-C.HWC (assuming that A is the guilty cell).

Indeed, HWC A→B→C (FIG. 1a) may be tackled by two different measures, namely either by delaying handover to cell B by making the cell B less attractive and UE goes hopefully directly to cell C and/or by making cell C more attractive that handover to cell C is earlier triggered than towards cell B.

The counter HWC irrespective whether incremented in the object class neighbor relation_A-B or neighbor relation_A-C or both does not correctly indicate how to tackle the problem, since it cannot be distinguished between HWC A→B→C and HWC A→C→B (FIG. 1b) where correction measures are completely different and even opposite. More specifically, from boundary A→B perspective, HWCs counted on this boundary could be due to HWC events A→B→C (which should lead to "later" A→B handovers)

Or HWC events A→C→B (which should lead to "earlier" A→B handovers)

A workaround for this problem is existing: Radio Access Network RAN doing the root cause analysis can simply ignore the HWC failure counter and would just use the counters "too late HO" TLH and "too early HO" TEH, namely in case of HWC A→B→C by increasing the counter TEH of neighbor relation neighbor relation_A-B of cell A and/or increasing the counter TLH of neighbor relation_A-C of cell A. For HWC A→C→B the procedure would be vice versa.

This means that only the counters
HO.OutFail.TooEarly
HO.OutFail.TooLate
are used, while the counter
HO.OutFail.ToWrongCell
is ignored.

The disadvantage is, however, that the information of the HWC failure type is lost on network management layer and consequently also any flexibility to react specifically on this failure type. With adding HWC failures to the counter TLH and TEH some artificial interdependency between the counters TEH of neighbor relation_A-B and TLH of neighbor relation_A-C is introduced. The corrective measures reduced to TLH and TEH by mobility robustness optimization may still improve the situation, but the actual HWC problem is not visible and, therefore, there is still a high probability that the corrective action does not show any benefit or even worsens the situation. These drawbacks make this workaround rather suboptimal with respect to a stable mobility robustness optimization solution.

In a single vendor environment, where eNB and network management are from the same vendor, the implementation in eNB and network management can obviously be aligned to some extent.

Hence, in view of the above drawbacks, there is a need for providing an enhanced Mobility Robustness Optimization.

SUMMARY OF THE INVENTION

Therefore, in order to overcome the drawbacks of the prior art, it is an object underlying the present invention to provide enhanced Handover to Wrong Cell failure types.

In particular, it is an object of the present invention to provide a method, apparatus and computer program product for providing enhancing mobility robustness optimization in self optimizing networks.

According to a first aspect of the present invention, there is provided a method, comprising providing neighbor relation information indicating relations between a handover source cell and one or more candidate handover target cells, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell, determining a first candidate handover target cell to which handover of the user equipment was unsuccessful and a second candidate handover target cell to which the user equipment has re-established a connection, out of the candidate handover target cells, and updating the first counter and/or the second counter of the neighbor relation information concerning the determined first and second candidate handover target cells.

According to a second aspect of the present invention, there is provided an apparatus, comprising processing means configured to provide neighbor relation information indicating relations between a handover source cell and one or more candidate handover target cells, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell, determination means configured to determine a first candidate handover target cell to which handover of the user equipment was unsuccessful and a second candidate handover target cell to which the user equipment has re-established a connection, out of the candidate handover target cells, and updating means configured to update the first counter and/or the second counter of the neighbor relation information concerning the determined first and second candidate handover target cells.

According to a third aspect of the present invention, there is provided a method, comprising receiving neighbor relation information from a base station, the neighbor information indicating relations between a handover source cell and one or more candidate handover target cells, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell, and analyzing the received neighbor information.

Under the third aspect of the present invention, in the course of analyzing, a neighbor relationship exceeding a defined threshold of handover to wrong cells events may be determined based on the received neighbor relation information. Further, the method may further comprise composing, based on the analysis result, handover related information for curtailing handover failures, and transmitting the handover related information to the base station. Still further, the composing may further comprise identifying an alternative candidate handover target cell for a neighbor relationship wherein the alternative candidate handover target cell causes less handover to wrong cells events compared to the detected neighbor relationship, and wherein the handover related information comprises information about the alternative candidate handover target cell.

According to a fourth aspect of the present invention, there is provided an apparatus, comprising reception means configured to receive neighbor relation information from a base station, the neighbor information indicating relations between a handover source cell and one or more candidate handover target cells, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell, and processing means configured to analyze the received neighbor information.

Under the fourth aspect of the present invention, the processing means may determine a neighbor relationship exceeding a defined threshold of handover to wrong cells events may be determined based on the received neighbor relation information. Further, the apparatus may further comprise a composition means configured to compose, based on the analysis result, handover related information for curtailing handover failures, and transmission means configured to cause transmission of the handover related information to the base station. Still further, the composition means may further be adapted to identify an alternative candidate handover target cell for a neighbor relationship wherein the alternative candidate handover target cell causes less handover to wrong cells events compared to the detected neighbor relationship, and wherein the handover related information comprises information about the alternative candidate handover target cell.

According to a fifth aspect of the present invention, there is provided a computer program product comprising computer-executable components which, when the program is run, are configured to carry out the method according to the first aspect or according to the third aspect.

Advantageous further developments or modifications of the aforementioned exemplary aspects of the present invention are set out in the dependent claims.

According to certain embodiments of the present invention, the events of connection re-establishment attempt are only counted when they are successful.

According to certain embodiments of the present invention, an unsuccessful handover comprises an initially failed handover attempt or a connection failure after the handover has been completed.

Further, according to certain embodiments of the present invention, the first counter of the neighbor relationship between the source cell and the first target cell is updated and/or the second counter of the neighbor relationship between the source cell and the second target cell is updated.

Further, according to certain embodiments of the present invention, the first and the second counters are counting handover to wrong cell failure events.

Further, according to certain embodiments of the present invention, performance management data comprising the neighbor information between a handover source cell and at least one candidate handover target cell is generated, and the performance management data is transmitted to a network management device.

According to certain embodiments of the present invention, each concerned counter is increased by 1.

According to certain embodiments of the present invention, either the first counter or the second counter is increased.

Thereby, it may be designated whether the problem leading to the updating of the first or second counter is a problem at the boundary between the handover source cell and the first candidate handover target cell or a problem at the boundary between the handover source cell and the second candidate handover target cell, and it may be decided, based on the designation, which of the first or second counter is increased. The designation may be based on measurement information form the user equipment and/or X2 information from neighboring cells.

Further, according to certain embodiments of the present invention, the respective value with which the first counter and the second counter is to be updated is weighted.

Thereby, the first counter and the second counter may be a non-integer counter. Further, the respective weights are determined by the network management device. Still further, as examples according to certain embodiments, the weight for the value relating to the handover to the first candidate handover target cell is 0.8 and the weight for the value relating to the handover to the second candidate handover target cell is 0.2.

Still further, the present invention may be implemented as an apparatus comprising at least one processor and at least one memory including computer program code, wherein the at least one memory and the computer program code configured to, with the at least one processor, cause the apparatus at least to perform providing neighbor relation information indicating relations between a handover source cell and one or more candidate handover target cells, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell, determining a first candidate handover target cell to which handover of the user equipment was unsuccessful and a second candidate handover target cell to which the user equipment has re-established a connection, out of the candidate handover target cells, and updating the first counter and/or the second counter of the neighbor relation information concerning the determined first and second candidate handover target cells.

Still further, the present invention may be implemented as an apparatus comprising at least one processor and at least one memory including computer program code, wherein the at least one memory and the computer program code configured to, with the at least one processor, cause the apparatus at least to perform receiving neighbor relation information from a base station, the neighbor information indicating relations between a handover source cell and one or more candidate handover target cells, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell, and analyzing the received neighbor information.

According to certain embodiments, the apparatus is further caused at least to perform, composing, based on the analysis result, handover related information for curtailing handover failures, and transmitting the handover related information to the base station.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

As already indicated above, the present invention generally relates to radio communications for LTE and self optimizing networks SON, and there to mobility robustness optimization MRO with respect to Handover to Wrong Cell HWC. 3GPP RAN WG3 has specified so-called mobility robustness optimization failure types "Too late HO" TLH, "Too early HO" TEH and "Handover to Wrong Cell" HWC and related counters which shall help to decide for the right correction measures. Those types/counters can be seen as mobility robustness optimization key performance indicators KPI. Such key performance indicators are counted per neighbor relation, e.g. if a "Too late HO" occurs at cell A and the UE tried to re-establish at cell B, the key performance indicators is assigned to the neighbor relation "cell A to cell B".

Thereby, the HWC involves a third cell other than the source cell and the target cell.

According to certain embodiments of the present invention, a further classification of the HWC counter in terms of distinguishing the cells where UE failed and where the UE attempts to reestablish the radio link connection with afterwards is provided. The naming as used in the following embodiments of the two counters is just exemplary.

With such distinction the operation, administration and maintenance OAM (e.g., Network Management) layer has the knowledge about the HWC failure type and all freedom how to tackle the situation.

Figure 2:
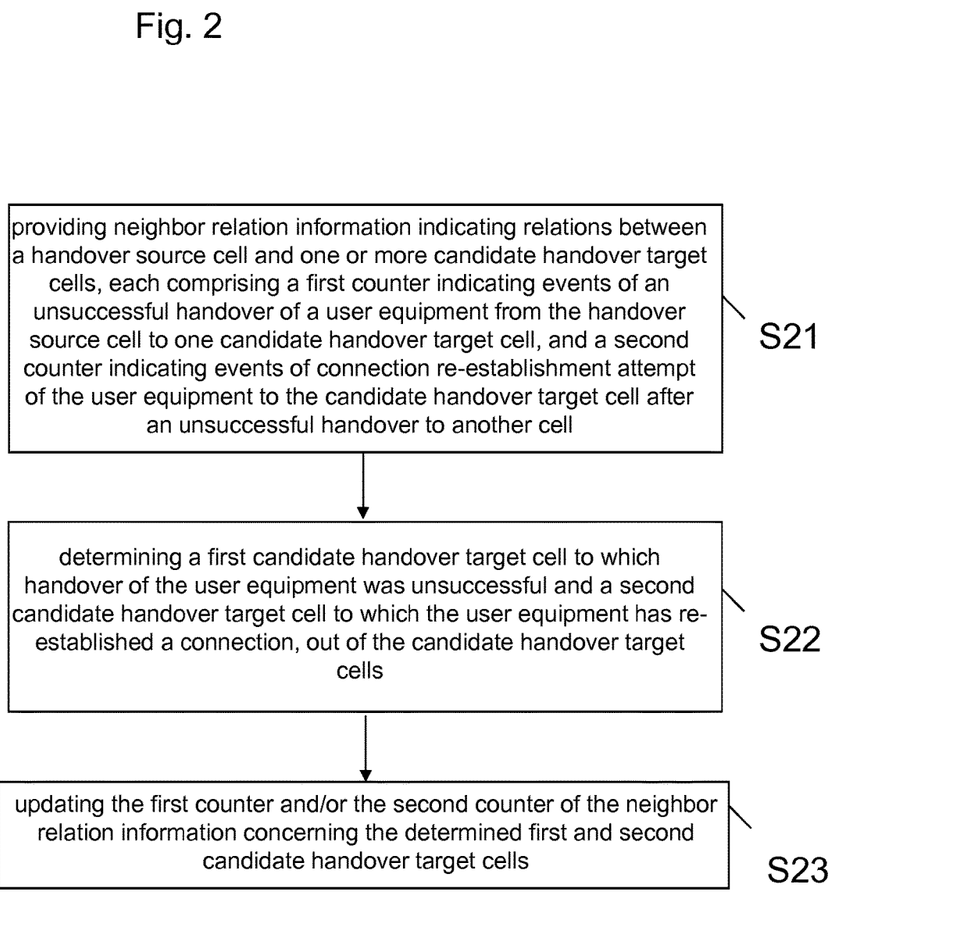
FIG. 2 illustrates a method according to certain embodiments of the invention.

FIG. 2 shows a principle flowchart of an example for a method according to certain embodiments of the present invention.

In Step S21, neighbor relation information indicating relations between a handover source cell and one or more candidate handover target cells is provided, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell.

In Step S22, a first candidate handover target cell to which handover of the user equipment was unsuccessful and a second candidate handover target cell to which the user equipment has re-established a connection, out of the candidate handover target cells, are determined.

In Step 23, the first counter and/or the second counter of the neighbor relation information concerning the determined first and second candidate handover target cells is updated.

Figure 3:
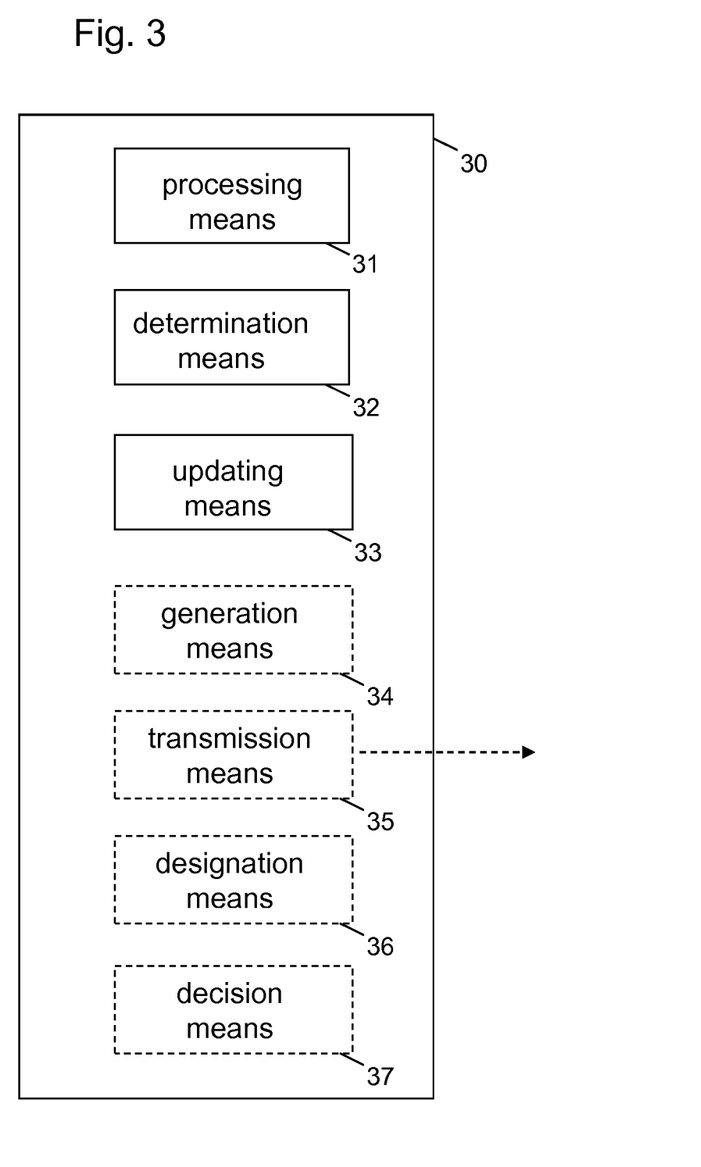
FIG. 3 schematically illustrates an apparatus according to certain embodiments of the invention.

FIG. 3 shows a principle configuration of an example for an apparatus according to certain embodiments of the present invention.

The apparatus 30 comprises a processing means 31 configured to provide neighbor relation information indicating relations between a handover source cell and one or more candidate handover target cells, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell, a determination means 32 configured to determine a first candidate handover target cell to which handover of the user equipment was unsuccessful and a second candidate handover target cell to which the user equipment has re-established a connection, out of the candidate handover target cells, and an updating means 33 configured to update the first counter and/or the second counter of the neighbor relation information concerning the determined first and second candidate handover target cells.

Further, as indicated with dashed lines, according to certain embodiments of the present invention the apparatus 30 may additionally comprise at least one of a generation means 34, a transmission means 35, a designation means 36 and a decision means 37. Thereby, the generation means 34 may be adapted to generate performance management data comprising the neighbor information between a handover source cell and at least one candidate handover target cell, and the transmission means 35 may be adapted to cause transmission of the performance management data to a network management device, which is indicated by an arrow in FIG. 3. The designation means 36 may be adapted to designate whether the problem leading to the updating of the first or second counter is a problem at the boundary between the handover source cell and the first candidate handover target cell or a problem at the boundary between the handover source cell and the second candidate handover target cell, and the decision means 37 may be adapted to decide, based on the designation, which of the first or second counter is increased.

Figure 4:
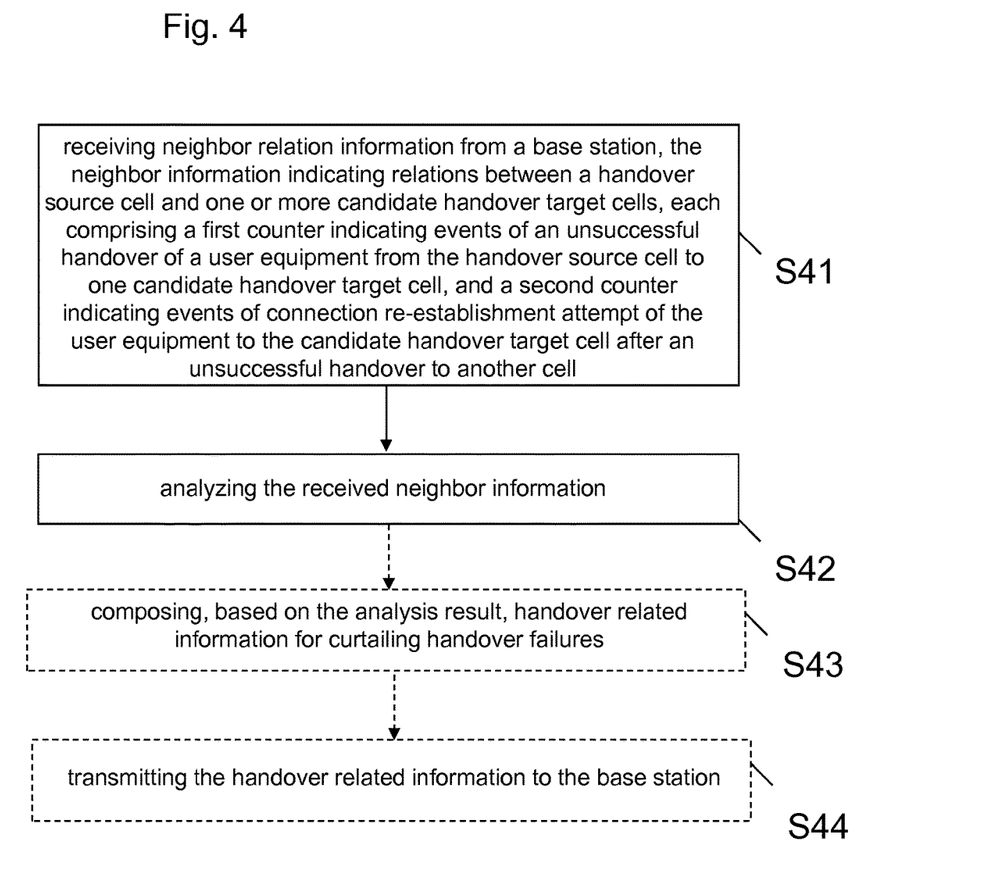
FIG. 4 illustrates a method according to certain embodiments of the invention.

FIG. 4 shows a principle flowchart of an example for a method according to certain embodiments of the present invention.

In Step S41, neighbor relation information from a base station is received, the neighbor information indicating relations between a handover source cell and one or more candidate handover target cells, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell.

In Step S42, the received neighbor information is analyzed.

Steps S43 and S43, which are indicated with dashed lines in FIG. 4, constitute further exemplary modifications according to certain embodiments of the present invention.

In particular, in Step S43, based on the analysis result, handover related information for curtailing handover failures is composed.

In Step S44, the handover related information is transmitted to the base station.

Figure 5:
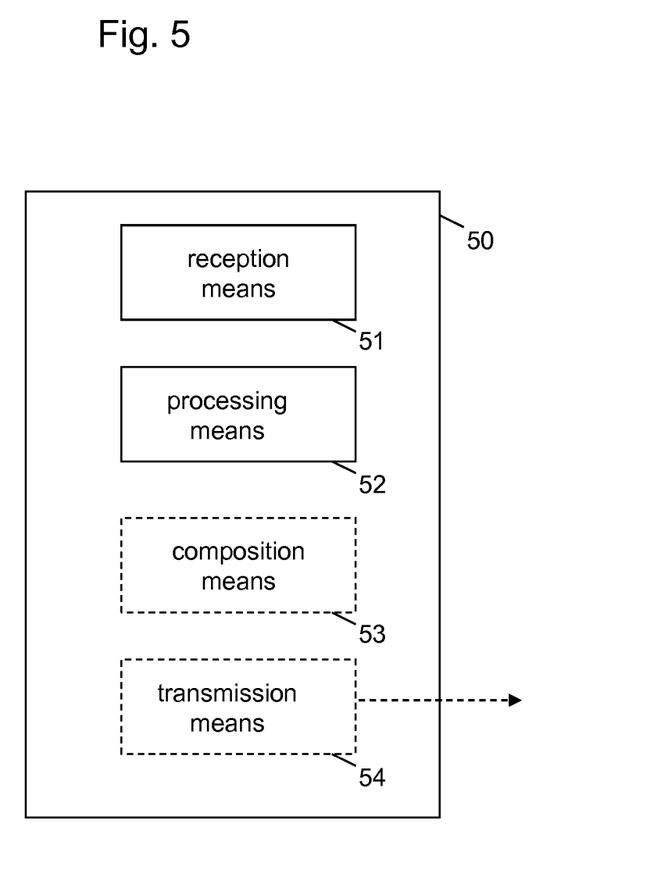
FIG. 5 schematically illustrates an apparatus according to certain embodiments of the invention.

FIG. 5 shows a principle configuration of an example for an apparatus according to certain embodiments of the present invention.

The apparatus 50 comprises a reception means 51 configured to receive neighbor relation information from a base station, the neighbor information indicating relations between a handover source cell and one or more candidate handover target cells, each comprising a first counter indicating events of an unsuccessful handover of a user equipment from the handover source cell to one candidate handover target cell, and a second counter indicating events of connection re-establishment attempt of the user equipment to the candidate handover target cell after an unsuccessful handover to another cell, and a processing means 52 configured to analyze the received neighbor information.

According to further exemplary modifications according to certain embodiments of the present invention depicted in dashed lines in FIG. 5, the apparatus may further comprise composition means 53 configured to compose, based on the analysis result, handover related information for curtailing handover failures, and transmission means 54 configured to cause transmission of the handover related information to the base station.

Figure 6:
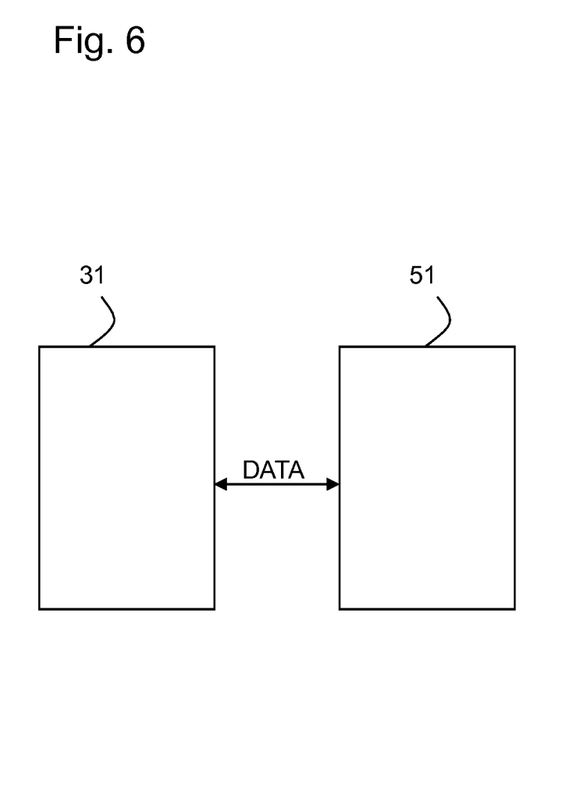
FIG. 6 schematically shows a system according to certain embodiments of the present invention.

FIG. 6 schematically shows a system according to certain embodiments of the present invention. In particular, the system comprises the above described apparatus 31, which may be, for example, implemented as a base station eNB, and the above described apparatus 51, which may be, for example, implemented as one of a base station eNB, a network management element NME and a network element comprising self optimizing networks SON functionality. The apparatus 31 and the apparatus 51 may mutually interchange data via known transmission/reception means provided therein. As indicated above, the present invention proposes a further classification of the HWC counter specification in terms of distinguishing the cells where UE failed and where it has reestablished afterwards. The naming of the two counters according to certain embodiments of the present invention is just exemplarily and they could be different in different implementations.

Suitable naming are as following:

Example 1: (exemplarily used in the following description of certain embodiments of the present invention)
HO.OutFail.ToWrongCellInitiallyTo
HO.OutFail.ToWrongCellReestablish Example 2: (The existing counter can be used for the first one)
HO.OutFail.ToWrongCell
HO.OutFail.ToWrongCellReestablish Example 3: (show the similarity to "too early" and "too late")
HO.OutFail.ToWrongCellEarly
HO.OutFail.ToWrongCellLate Example 4: (would just neutrally split the whole thing into 2 handovers)
HO.OutFail.ToWrongCellFirst
HO.OutFail.ToWrongCellSecond Example 5
HO.OutFail.ToWrongCellTarget
HO.OutFail.ToWrongCellReestablish This means each neighbor relation (neighbor relation) consist of following four counters in case of intra-frequency handover:
HO.IntraFreqOutFail.TooEarly
HO.IntraFreqOutFail.TooLate
HO. Intra FreqOutFail.ToWrongCellInitiallyTo
HO. Intra FreqOutFail.ToWrongCellRestablish According to certain embodiments of the present invention, in case of HWC A→B→C the counter "HO.OutFail.ToWrongCellInitiallyTo" on the neighbor relation (A-B) that was the target in the HO command will be increased, while the counter "HO.OutFail.ToWrongCellReestablish" on the neighbor relation (A-C) that the UE has been attempted to re-establish the radio link connection to will be increased.

With this distinction the network management layer still has the knowledge to about this HWC failure type and all freedom how to tackle it. Thus, for instance, one can give different weights to the two counters in the final decision process about making a neighbor more attractive (increase CIO) or more unattractive (decrease CIO).

According to certain embodiments of the present invention, the counting of those events by the eNB could be specified in different ways:

1. Upon a HWC A→B→C, both HWC counters are increased by 1
2. Upon a HWC A→B→C, either one or the other counter is increased. The eNB will decide autonomously and for every HWC individually which counter is increased.
3. Upon a HWC A→B→C, both HWC counters are increased by 2 different weights configured by network management. For example, network management configures weight 0.8 for the first HO A→B and 0.2 for the second handover A→C. The eNB would, upon detecting HWC A→B→C, increase the counter HO.IntraFreqOutFail.ToWrongCellInitiallyTo by 0.8 and HO.IntraFreqOutFail.ToWrongCellReestablish by 0.2. This obviously requires non-integer counters.

Option 2 allows for smart eNB implementations. For every individual failure, the eNB may decide whether it was a problem on boundary A→B or boundary A→C. Note that the eNB has much more radio knowledge than network management (detailed UE measurements and other reports, X2 information from neighbors, etc.). The other options 1. and 3. do not allow for such a clever "per-event" eNB decision.

Hereby, according to certain embodiments of the present invention, it is to be noted that option 2 covers corner cases as well:

The eNB can only count it as a A→B problem (i.e. always increases the first counter and never the second)

Randomly with a certain probability: this would converge to option 3. Example, the eNB counts 80% of the HWCs A→B→C as A->B problem, and 20% as A->C problem. This has the same effect as using the weights 0.8 and 0.2 as described above.

Another embodiment results from a deployment variant that is keeping the direct dependency between the failed handover for this neighbor relation and the candidate neighbor relations that may indicate the better target cell alternatives for the failed handover. In data bank systems this can be typically achieved by so called "containment". The HO.OutFail.ToWrongCellInitiallyTo measurement can contain one or more HO.OutFail.ToWrongCellReestablish counters; each of the contained counters holds the count for a candidate neighbor relation, i.e. the EUtranRelation that targets to the cell where the UE has attempted to re-establish the radio link connection after the failure. With this method it is very easy to select the most appropriate alternative target cell for a neighbor relation causing too many handovers to a wrong cell.

As already indicated above, according to certain embodiments of the present invention an unsuccessful handover comprises an initially failed handover attempt or a connection failure shortly after the handover has been completed. Thereby, the term 'shortly' indicates that it would not be HWC if the Radio Link Failure RLF occurs not immediately after the handover.

In particular, according to the specification defined in prior art document [1], Handover to Wrong Cell is defined as follows: "An RLF occurs shortly after a successful handover from a source cell to a target cell or a handover failure occurs during the handover procedure; the UE attempts to re-establish the radio link connection in a cell other than the source cell and the target cell".

In this regard, the time span indicated by the term 'shortly' may be 3 to 5 seconds, as example. This time span may be used to distinguish between too late one side and too early && HWC failure types on the other. Further, this time span is a MRO configuration parameter, called "Tstore_UE_cntxt".

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under LTE™ or LTE-Advanced, and can advantageously be implemented also in controllers, base stations, user equipments or smart phones, or perself optimizing networksal computers connectable to such networks. That is, it can be implemented e.g. as/in chipsets to connected devices.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
HO Handover
HOF Handover Failure
RLF Radio Link Failure
HWC Handover to Wrong Cell
TLH Too Late Handover
TEH Too Early Handover
GPRS General Packet Radio Service
LTE Long Term Evolution
3GPP 3$^{rd}$ Generation Partnership Project
eNB evolved Node B (base station in LTE)
UE User Equipment

What is claimed is:

1. A method, comprising:
providing neighbor relation information indicating relations between a handover source cell and one or more candidate handover target cells, each comprising a first counter indicating a number of events of unsuccessful handover attempts of a user equipment from the handover source cell to one candidate handover target cell, and a second counter indicating a number of events of connection re-establishment attempts of the user equipment to the candidate handover target cell after an unsuccessful handover to another cell;
determining a first candidate handover target cell to which handover of the user equipment was unsuccessful and a second candidate handover target cell to which the user equipment has re-established a connection, out of the candidate handover target cells;
designating whether at least one of the unsuccessful handover attempts and the connection re-establishment attempts is caused by a problem at a boundary between the handover source cell and the first candidate handover target cell or at a boundary between the handover source cell and the second candidate handover target cell;
based on the designation, identifying which at least one of the first counter or the second counter is to be updated; and
updating the identified at least one of the first counter or the second counter with a respective value the number of events of the attempts associated with the determined first candidate handover target cell and second candidate handover target cell.

2. The method according to claim 1, wherein the events of connection re-establishment attempt are only counted when they are successful.

3. The method according to claim 1, further comprising:
generating performance management data comprising the neighbor relation information between a handover source cell and at least one candidate handover target cell; and
transmitting the performance management data to a network management device.

4. The method according to claim 1,
wherein the first counter of the neighbor relationship information is of a number of events of unsuccessful handover attempts between the source cell and the first target cell and the second counter of the neighbor relationship information is of a number of events of connection re-establishment attempts between the source cell and the second target cell, and wherein the designation is based on measurement information from at least one of the user equipment and X2 information from neighboring cells.

5. The method according to claim 1, wherein the respective value with which the first counter and the second counter are updated is weighted by a network management device,
wherein the weight for the respective value relating to the handover to the first candidate handover target cell is 0.8 and the weight for the respective value relating to the handover to the second candidate handover target cell is 0.2.

6. The method according to claim 1, wherein the updating comprises increasing the first counter indicating the number of events of unsuccessful handover attempts, wherein the second counter indicating a number of events of connection re-establishment attempts is not increased or decreased.

7. An apparatus, comprising:
at least one processor; and
at least one memory including computer program code, where the at least one memory and the computer program code are configured, with the at least one processor, to cause the apparatus to at least:
provide neighbor relation information indicating relations between a handover source cell and one or more candidate handover target cells, each comprising a first counter indicating a number of events of unsuccessful handover attempts of a user equipment from the handover source cell to one candidate handover target cell, and a second counter indicating a number of events of connection re-establishment attempts of the user equipment to the candidate handover target cell after an unsuccessful handover to another cell;
determine a first candidate handover target cell to which handover of the user equipment was unsuccessful and a second candidate handover target cell to which the user equipment has reestablished a connection, out of the candidate handover target cells;
designate whether at least one of the unsuccessful handover attempts and the connection re-establishment attempts is caused by a problem at a boundary between the handover source cell and the first candidate handover target cell or at a boundary between the handover source cell and the second candidate handover target cell;
based on the designation, identifying which at least one of the first counter or the second counter is to be updated; and
update the identified at least one of the first counter or the second counter with a respective value the number of events of the attempts associated with the first candidate handover target cell and the second candidate handover target cell.

8. The apparatus according to claim 7, wherein the events of connection re-establishment attempt are only counted when they are successful.

9. The apparatus according to claim 7, wherein the at least one memory including the computer program code is configured with the at least one processor to cause the apparatus to:
generate performance management data comprising the neighbor relation information between a handover source cell and at least one candidate handover target cell; and
cause transmission of the performance management data to a network management device.

10. The apparatus according to claim 7, wherein the first and the second counters are counting handover to wrong cell failure event, wherein the first counter of the neighbor relationship information is of a number of events of unsuccessful handover attempts between the source cell and the first target cell and the second counter of the neighbor relationship information is of a number of events of connection re-establishment attempts between the source cell and the second target cell, wherein the designation is based on measurement information from at least one of the user equipment and X2 information from neighboring cells.

11. The apparatus according to claim 7,
wherein the respective value with which the first counter and the second counter are updated is weighted by a network management device,
wherein the weight for the respective value relating to the handover to the first candidate handover target cell is 0.8 and the weight for the respective value relating to the handover to the second candidate handover target cell is 0.2.

12. The apparatus according to claim 7, wherein the apparatus is a base station.

13. A method, comprising:
receiving neighbor relation information from a base station, the neighbor information indicating relations between a handover source cell and one or more candidate handover target cells, each comprising a first counter indicating a number of events of unsuccessful handover attempts of a user equipment from the handover source cell to one candidate handover target cell, and a second counter indicating a number of events of connection re-establishment attempts of the user equipment to the candidate handover target cell after an unsuccessful handover to another cell, wherein at least one of the first counter and the second counter was updated based on whether events of the unsuccessful handover attempts and the connection re-established attempts were caused by a problem at a boundary between the handover source cell and first candidate handover target cell or at a boundary between the handover source cell and the second candidate handover target cell; and
analyzing the received neighbor information; and
composing, based on the analysis result, handover related information for curtailing handover failures; and
transmitting the handover related information to the base station.

14. An apparatus, comprising:
at least one processor; and
at least one memory including computer program code, where the at least one memory and the computer program code are configured, with the at least one processor, to cause the apparatus to at least:
receive neighbor relation information from a base station, the neighbor information indicating relations between a handover source cell and one or more candidate handover target cells, each comprising a first counter indicating a number of events of unsuccessful handover attempts of a user equipment from the handover source cell to one candidate handover target cell, and a second counter indicating a number of events of connection re-establishment attempts of the user equipment to the candidate handover target cell after an unsuccessful handover to another cell, wherein at least one of the first counter and the second counter was updated based on whether events of the unsuccessful handover attempts and the connection re-established attempts were caused by a problem at a boundary between the handover source cell and first candidate handover target cell or at a boundary between the handover source cell and the second candidate handover target cell; and analyze the received neighbor information; and composition means configured to compose, based on the analysis result, handover related information for curtailing handover failures; and cause transmission of the handover related information to the base station.

15. The apparatus according to claim 14, wherein the apparatus is one of a base station, a network management element and a network element comprising self optimizing networks functionality.

* * * * *